Feb. 16, 1937. A. BECK 2,070,558
PROCESS FOR REFINING CHOCOLATE MASSES
Original Filed July 24, 1934
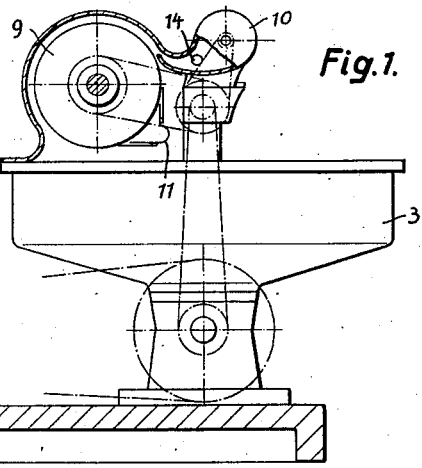
Fig. 1.
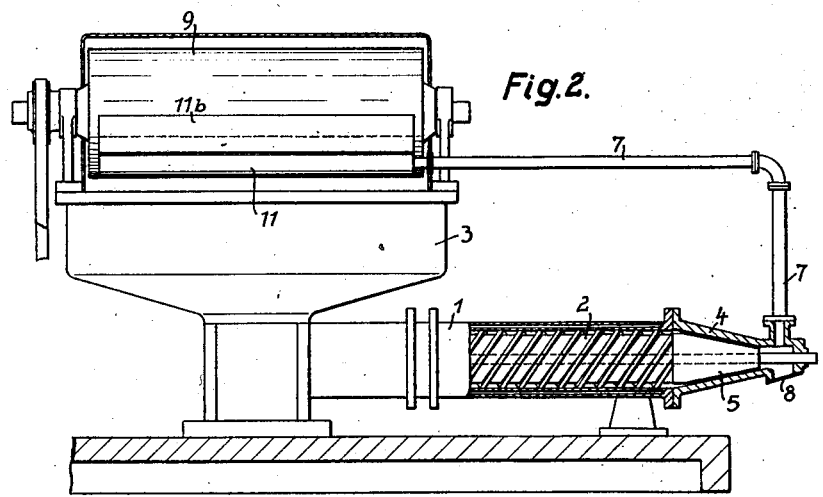
Fig. 2.
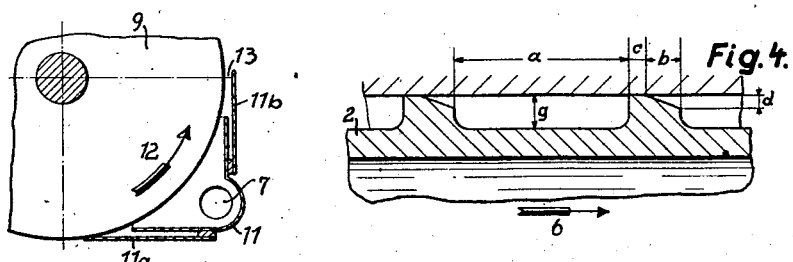
Fig. 3.
Fig. 4.
Inventor:
A. Beck
By: Glascock Downing & Seebold
Attys.

Patented Feb. 16, 1937

2,070,558

UNITED STATES PATENT OFFICE 2,070,558

PROCESS FOR REFINING CHOCOLATE MASSES

August Beck, Wernigerode, Germany

Original application July 24, 1934, Serial No. 736,794. Divided and this application April 11, 1935, Serial No. 15,879. In Germany January 19, 1934

2 Claims. (Cl. 99—23)

This application is a division of application of August Beck, Serial Number 736,794, filed July 24, 1934.

The invention relates to a machine, for and a process of refining chocolate masses and similar masses used in the manufacture of sweet-meats.

The object of the invention is to improve the refining of the masses by the treatment with air.

One example of a machine or apparatus for carrying out the process according to the present invention is illustrated in the accompanying drawing in which:

Figures 1 and 2 show the refining machine combined with a further machine, viewed from the front and from the side.

Figure 3 shows, on a larger scale, the inlet to the additional machine for the chocolate mass coming out of the worm.

Figure 4 shows, on a larger scale, the form of the worm thread.

A worm housing 1 contains a rotary conveyer worm 2. The forward end of the housing is connected to a storage tank 3 for the chocolate mass. The rear end of the worm housing 1 is connected to a cone shaped casing 4, in which a cone 5 rotates, the cone preferably having a smooth periphery. The cone 5 is connected at its larger diameter to the rear end of the worm. In certain cases, the cone can be formed integrally with the worm. The thread proportions of one example of a suitable worm are shown in Figure 4. The worm is triple-threaded and has a thread depth $g$ of about 7 mm. The distance of the helices from one another, i. e. the distance $a$, is about 35 mm., while the important dimensions $b$, $c$ and $d$ for the bevelling off of the crests of the threads in the present example are as follows:—
$b=7$ mm., $c=3$ mm. and $d=2$–$3$ mm. The crests of the threads are bevelled off on the front side in the conveying direction, which is indicated in Figure 4 by the arrow 6.

The mass from the container 3 passes into the worm housing 1, where it is seized by the worm 2 and is conveyed through the worm housing and through the casing 4. The mass is thereby intensively worked and is finely disintegrated by the grinding cone 5. Axial displacement of the cone alters the clearance between the cone 5 and the casing 4, and so, in the simplest manner, the resistance and with it the degree of fineness can be increased. Also with very small clearance and, therefore, with very great resistance, the delivery output is maintained by virtue of the small thread depth $g$, even if, as desired, a substantial part of the real delivery out-put is taken out by the back flow of the mass itself; not on the amount emerging from the end of the casing 4. Thus it has been shown that by suitable increase of resistance, the back flow amount is caused to rise to over the half of the amount delivered by the worm in the unit of time. In a particular case, the quantity delivered by the worm amounts, e. g. to 2,000 kg. in the unit of time, while from the casing 4 in the same time, only 800 kg. emerge; therefore, 1,200 kg. have flowed back in this unit of time. As above mentioned, the back-flowing portion of the mass is, owing to the bevelling of the forward edge of the crests of the threads, compelled to squeeze itself between the outer circumference of the worm threads and the worm housing. In this manner, the particles which already have become very small through the previous treatment are still further reduced in size and the mass is, therefore, still further refined.

From the casing 4, the mass passes back into the container 3 through a pipe 7. The treatment can be repeated as often as desired. When the desired degree of fineness is attained, the mass can be discharged from the casing 4 by opening an outlet 8, which has been closed during the working of the mass.

If desired, a pipe may be connected to the outlet 8 and this pipe may deliver the mass to another working-up machine, e. g. to a chocolate moulding machine.

It is preferable to subject the mass to an air treatment known in itself and to combine the refining machine consisting of the worm, with an apparatus for the air treatment in such a manner that the mass which comes out of the worm is not led immediately into the storage tank 3, but is passed first through the apparatus for the air treatment. The mass is in this way subjected alternately to the mechanical working and to the air treatment.

In the illustrated example according to Figures 1 and 2, the apparatus for air treatment is mounted on the storage tank 3 and the pipe 7 is connected to the inlet of this apparatus. The apparatus for the air treatment consists in general of a uniformly rotating drum 9, on the circumference of which the mass is spread out in a thin layer, and of a blower 10, which directs a stream of fresh air onto the spread out mass.

At the underside of the drum 9, a distributing duct or trough 11 is fitted in the manner illustrated in Figure 3. The direction of rotation of the drum is indicated by the arrow 12. The horizontal wall 11a of the duct fits closely to the circumference of the drum, but a gap 13 is left between the upper edge of the vertical wall 11b and the circumference of the drum. The width of the gap 13 may be adjustable. The pipe 7 opens into the duct 11. The chocolate mass entering into the duct is carried along by the drum which covers itself with a chocolate layer by its rotation, the thickness of the layer corresponding to the width of the gap 13, and it may be approximately 0.8 mm. to 1 mm. Spreading out of the chocolate as a thin layer is essential in order to ensure an intensive action by the oxygen of the supply of fresh air. With a spreading out in a layer of thickness of roughly 0.8 to 1 mm. a mass of 100 kg. is distributed on a surface of approximately 170 sq. m. and for this reason practically each particle of the mass is exposed to the action of the air.

It is further essential in the air treatment that fresh air is always used and that the air which is once blown does not circulate in the apparatus. If fresh air is used, the water can be extracted from the mass, leaving but very slight traces of water behind, and so that generation of the aroma is rendered possible. Experience has shown that so long as excess water is contained in the mass, the aroma cannot be generated. An adequate extraction of the water, however, is only possible if fresh air is used, since air which is continuously circulated round the drum is quickly saturated with the water to be withdrawn from the chocolate, so that it can no longer take up water.

In the delivery pipe of the ventilator 10, a heating device 14, for example an electric heater, is fitted, which heats the air to approximately 40 to 100° C. according to requirements, so that it is hot and dry when it impinges upon the chocolate mass. The blower is so designed that it delivers an excess of air, so that the water of the chocolate is extracted rapidly and but very small traces of water remain.

As soon as the water is extracted to the required degree, the temperature of the air can be kept somewhat lower than formerly, since the generation of the aroma proceeds most rapidly at a definite temperature, which lies roughly between 40 and 80°. It is essential during this time, as it was when extracting the water from the chocolate, that fresh air be used and that sufficiently large amounts of oxygen are available for the generation of the aroma.

The advantages given by the special apparatus for the air treatment of the chocolate mass are independent of the present apparatus for refining of the mass by mechanical working. In other words, these advantages are, therefore, independent of whether the apparatus is or is not combined with a particular refining machine of the type described and illustrated. The apparatus for air treatment can be applied also independently of the worm refining machine or in combination with another machine for refining the mass by mechanical working.

I claim:

1. A process for refining chocolate masses for use in sweetmeat manufacture, in which the chocolate is refined mechanically and is spread out as a thin layer and subjected to the action of hot air the temperature of which is in the neighborhood of 100° C. for a sufficient time to extract the water from said masses and is then lowered to the neighborhood of 80° C. to generate the aroma of said masses.

2. A process for refining chocolate masses for use in sweetmeat manufacture, in which the chocolate is refined mechanically and is spread out as a thin layer and subjected to the action of hot fresh air the temperature of which is in the neighborhood of 100° C. for a sufficient time to extract the water from said masses and is then lowered to the neighborhood of 80° C. to generate the aroma of said masses.

AUGUST BECK.